UNITED STATES PATENT OFFICE.

J. K. BAER, OF HIGHLAND, ILLINOIS.

IMPROVEMENT IN THE MANUFACTURE OF DOMESTIC WINES.

Specification forming part of Letters Patent No. 35,915, dated July 22, 1862.

*To all whom it may concern:*

Be it known that I, J. K. BAER, of Highland, in the county of Madison and State of Illinois, have invented a new and Improved Process for the Manufacture of Wine from Various Vegetable Substances; and I do hereby declare that the following is a full, clear, and exact description of the same.

The object of this invention is to manufacture a cheap, healthy, and most excellent wine for families and others from the juice of grapes or other fruits, berries, or herbs.

The invention consists in the employment or use of honey dissolved in pure water, and introduced into the juice which is to be converted into wine as a ferment, or, more properly speaking, as an augmentation of the fermentable and fermenting substances for the purpose of producing a very large (five to eight fold) quantity, and at the same time an excellent quality of wine from the juice of grapes, berries, fruits, or other vegetable substances.

To enable those skilled in the art to make and correctly use my invention, I will proceed to describe it.

In order to produce five gallons of wine I take a small bucketful (about two gallons) of grapes, either cultivated or wild, cultivated grapes with the stalks, wild ones without. Instead of the grapes, however, other berries, fruits, or herbs may be used, as will be hereinafter more fully explained. These grapes, berries, fruits, or herbs are mashed in a wooden tub with a wooden pounder or pestle. Then add two gallons of pure rain-water. Stir and rub well, and let the mixture stand for one hour in a cool cellar. Then press through a sieve of tin, brass, or copper into another tub. Add again two gallons of rain-water to the mashed berries, fruits, or herbs; stir and rub, and let stand again for two hours. Then press through the sieve and add the juice to the first quantity. Add finally one gallon of rain-water to the husks or remains; stir and rub again, and let stand five or six hours. Press again through the sieve, so that in all five gallons of juice are obtained from one bucket, or about two gallons of berries, fruits, or herbs. All the ingredients or parts constituting the wine must be washed out and separated perfectly from the flesh of the husks, especially the acid and the fermentable matters. All the manipulations ought to be carried on in a cool cellar. In the meantime take two pints of pure genuine honey. Heat it with one gallon of pure rain-water in a good tin or copper kettle until it boils gently, and skim carefully with a tin skimmer. If well skimmed, pour the hot honey-water into a wooden tub and let it cool. Now add from six to eight pounds of white sugar (if no grape-sugar can be obtained) to the five gallons of juice standing in the cellar, the quantity of sugar being varied to make the wine weaker or stronger after fermentation; stir, and let stand for about one hour. Then stir again until the sugar is completely dissolved. Then add the cool honey-water as the fermenting substance to the sweetened juice. Stir well, and pour the must thus prepared, by means of a funnel, into a clean keg, not quite filling the same, leaving about one inch space at the bung-hole, and place a vine-leaf upon the open bung-hole loaded with a small sand-bag, (clean sand, well dried and tied up in a piece of muslin.) Then let the must quietly ferment in a dry and cool cellar. In four or five days the fermentation begins, and will last from six to eight weeks. The must will never rise and flow out by the bung-hole, the fermenting process going on quietly and most regularly on account of the peculiar qualities of the honey. Renew the vine-leaf as often as necessary. Keep the sand-bag, leaf, and bung-hole clean. The keg must be well fastened and prevented from rolling by four small wooden wedges. After the wine has become clear it is drawn from the lees into another clean keg filled to the bung and then tightly corked up. In two to three weeks the wine will be ready for use, though it gains in flavor and delicacy if kept in the keg till the following spring. After that time it may be drawn off in bottles. If kept in barrels of thirty to forty gallons, the wine becomes best and ripens soonest.

This process has been successfully tried with the following fruits, berries, and herbs, viz: blackberries, which are taken before quite ripe; common sour cherries, quite ripe, the stones and stalks having been removed; peaches, the stones and skins being removed; plums, the stones only being removed; apples; pears; crab-apples, to be gathered when ripe and kept in open flour-barrels until they become yellow, like wax; gooseberries; rasberries and strawberries; currants; tender fleshy shoots from cultivated vines without the leaves, cut to small pieces of the size of berries; stems of rhubarb without the leaves and cut to small pieces; pomace or apple-squash; husks of pressed grapes. It is obvious, however, that my process may be applied with equal advantage to every vegetable substance from which juice may be obtained similar to the above-named materials.

Having thus fully described my invention, what I claim as new, and desire to secure by Letters Patent, is—

The within-described process of manufacturing wine by treating the diluted juice of vegetable substances, such as specified, with honey, substantially in the manner set forth.

JOHN K. BAER.

Witnesses:
JOHN BLATTNER,
J. FR. WACHSMUT.